US010826965B2

(12) United States Patent
Boshev

(10) Patent No.: US 10,826,965 B2
(45) Date of Patent: Nov. 3, 2020

(54) NETWORK MONITORING TO IDENTIFY NETWORK ISSUES

(71) Applicant: SAP SE, Walldorf (DE)

(72) Inventor: Stoyan Boshev, Sofia (BG)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 15/362,823

(22) Filed: Nov. 29, 2016

(65) Prior Publication Data

US 2018/0152337 A1 May 31, 2018

(51) Int. Cl.
H04L 29/08 (2006.01)
H04L 12/26 (2006.01)

(52) U.S. Cl.
CPC .......... H04L 67/02 (2013.01); H04L 43/0852 (2013.01); H04L 43/16 (2013.01); H04L 43/50 (2013.01)

(58) Field of Classification Search
CPC ..... H04L 41/0631; H04L 67/02; H04L 43/10; H04L 67/10; H04L 43/0852; H04L 43/50; H04L 43/16
See application file for complete search history.

(56) References Cited

U.S. PATENT DOCUMENTS

| 9,172,593 B2 * | 10/2015 | Kane | H04L 41/00 |
| 9,356,956 B2 * | 5/2016 | Kruglick | H04L 63/02 |
| 2004/0030924 A1 * | 2/2004 | Griswold | H04L 63/0236 726/26 |
| 2009/0303882 A1 * | 12/2009 | Tanaka | H04L 12/4641 370/237 |

(Continued)

OTHER PUBLICATIONS

Qiu, Tongqing, Ge, Zihui, Pei, Dan, Wang, Jia, Xu, Jun (Jim), What Happened in my Network? Mining Network Events from Router Syslogs, Nov. 1, 2010, http://conferences.sigcomm.org/imc/2010/papers/p472.pdf (Year: 2010).*

(Continued)

Primary Examiner — John A Follansbee
Assistant Examiner — Lam T Do
(74) Attorney, Agent, or Firm — Buckley, Maschoff & Talwalkar LLC

(57) ABSTRACT

Various embodiments of systems, computer program products, and methods to monitor a network to identify network issues are described herein. In an aspect, requests are routed to access a sample application at predetermined time intervals via different defined network paths between a monitoring application unit and the sample application in a network. Response codes associated with execution of the requests are received from the sample application via the corresponding defined network paths. Execution results of the requests to include the response codes and execution time of the requests corresponding to the different defined network paths are recorded. Further, the execution results for a time period are analyzed to identify network issues in the network. Identifying the network issues includes identifying problematic network paths based on the analysis of the execution results, and identifying problematic network components in the problematic network paths by analyzing the problematic network paths.

15 Claims, 5 Drawing Sheets

(56) References Cited

U.S. PATENT DOCUMENTS

| | | | | |
|---|---|---|---|---|
| 2011/0149721 | A1* | 6/2011 | Yang | H04L 41/0654 |
| | | | | 370/216 |
| 2013/0041936 | A1* | 2/2013 | Ohtake | H04L 67/02 |
| | | | | 709/203 |
| 2014/0071832 | A1* | 3/2014 | Johnsson | H04L 45/70 |
| | | | | 370/242 |
| 2015/0381459 | A1* | 12/2015 | Xiao | H04L 41/12 |
| | | | | 370/253 |
| 2017/0012837 | A1* | 1/2017 | Zaidi | G06Q 40/02 |
| 2017/0026292 | A1* | 1/2017 | Smith | H04L 43/16 |
| 2017/0093811 | A1* | 3/2017 | Dolev | H04L 45/1287 |
| 2017/0149639 | A1* | 5/2017 | Vasseur | H04L 12/44 |
| 2018/0048527 | A1* | 2/2018 | Ganjam | H04L 41/12 |
| 2018/0270141 | A1* | 9/2018 | Burbridge | H04L 41/5009 |

OTHER PUBLICATIONS

Microsoft, "Using Failed Request Tracing Rules to Troubleshoot Application Request Routing;" Jul. 2, 2008, https://docs.microsoft.com/en-us/iis/troubleshoot/using-failed-request-tracing/using-failed-request-tracing-rules-to-troubleshoot-application-request-routing-arr (Year: 2008).*

* cited by examiner

NETWORK MONITORING TO IDENTIFY NETWORK ISSUES

BACKGROUND

Networks are used to interconnect multiple devices, such as computing devices, and allow the communication of data between the various interconnected devices. A network may include network components such as load balancer, gateways, switches, and the like to route the data. Further, network management is a process of managing the network components and network communication links to provide network services. Network issues such as performance issues (e.g., a request that takes long time to execute compared to normal execution time due to temporary overloading of a network component), connection issues (e.g., a connection that may be interrupted in middle of executing the request, and no response is received), and the like may disrupt network services. During network issues, the network components may not be able to communicate at a normal speed, thereby reducing performance of the network. In this situation, effectively tracking the network issues and the source of the problem can be a challenge.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to monitor a network to identify network issues are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (retrieving, determining, transmitting, rendering, triggering and so on) may be performed by a hardware device (e.g., computing system), even if the action may be authorized, initiated or triggered by a user, or even if the hardware device is controlled by a computer program, software, firmware, and the like.

Figure 1:
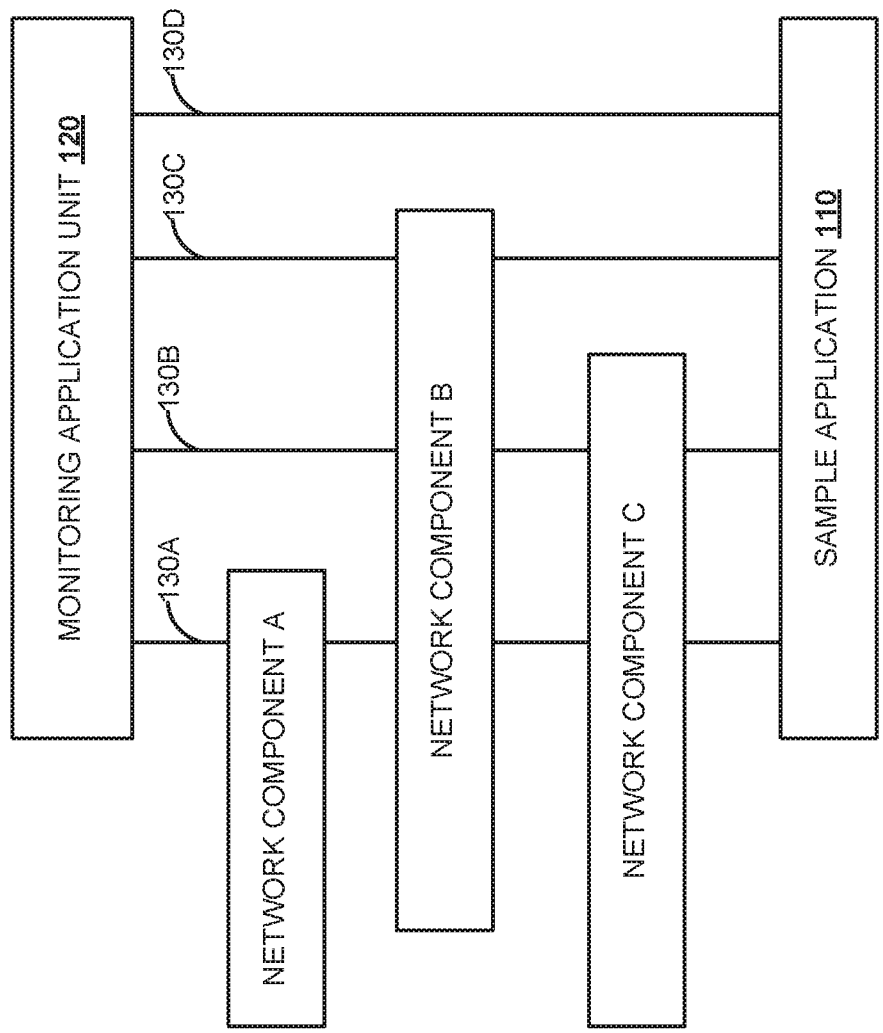
FIG. 1 is a block diagram of a computing environment illustrating network monitoring to identify network issues, according to one embodiment.

FIG. 1 is a block diagram of a computing environment illustrating network monitoring to identify network issues, according to one embodiment. The network can be defined as a group of two or more computer systems linked together to communicate data. For example, monitoring application unit 120 can be a part of a computer system, and sample application 110 can be a part of another computer system, which are connected by the network. The network can be, but not limited to local-area network (LAN), wide-area network (WAN), campus-area networks (CAN), metropolitan-area network (MAN) and home-area network (HAN). In one embodiment, the network facilitates to execute requests (e.g., Hypertext Transfer Protocol (HTTP) requests) for accessing different applications. An application may include application program to perform a specific function for users or, in some cases, for another application program. Examples of applications may include, but not limited to, word processors, database programs, Web browsers, development tools, image editing programs, and communication programs.

In one embodiment, the network is monitored to identify network issues. To monitor the network, requests (e.g., HTTP requests) are routed to access the sample application 110 at a predetermined time intervals via different defined network paths (e.g., 130A, 130B, 130C, and 130D). The different network paths can be predefined and may include one or a set of network components (e.g., proxy, firewall, load balancer, switch and the like) or no network component. For example, the network path 130A includes a network component A (e.g., proxy), a network component B (e.g., firewall) and a network component C (e.g., load balancer). The network path 130B includes the network component B (e.g., firewall) and the network component C (e.g., load balancer). The network path 130C includes the network component B (e.g., firewall). Further, the network path 130D may not include any network components, instead the request is directly executed to access the sample application 110. For example, the direct call to the sample application 110 can be realized by using the Internet protocol (IP) address of the sample application 110 to make the HTTP request. Instead of specifying the host of the sample application 110, the monitoring application unit 120 can use the IP address (e.g. instead of using the request such as "http://www.sampleapp.com/test", the monitoring application unit 120 can use the IP address, e.g., "http://123.201.11.10/test"). Thereby, the network components can be reduced in the network path when the monitoring application unit 120 and the sample application 110 are in one network. In an exemplar configuration, the setup of the different network paths is realized during the setup of a HTTP client used for execution of the HTTP requests. For example, for including the network component "proxy" into the network path, the network component "proxy" is configured while creating and configuring the HTTP client.

In one embodiment, the sample application 110 serving the requests can be a dummy application or a test application. For example, for successful execution of an HTTP request, a response code "response code 200" is returned with an empty response body. When an unexpected condition which prevents from fulfilling the HTTP request has occurred, a response code "internal error 500" is returned. A response code "service temporarily overloaded 503" is returned when there is an overload of requests. Further, the execution results, for example, responses to the requests, including corresponding response codes, corresponding execution time of the requests and the like, are recorded for the different defined network paths at monitoring application unit 120.

In one embodiment, the execution results are provided to users by the monitoring application unit 120 for analysis. For example, upon receiving an instruction to analyze the execution results for a time period, the monitoring application unit 120 identify problematic network paths by analyzing the execution results associated with the time period. The problematic network paths are identified based on determining whether an execution result is a successful execution or an unsuccessful execution. The execution result is considered as the successful execution or the unsuccessful execution based on the corresponding response code, the corresponding execution time, and a predefined execution time threshold. The predefined execution time threshold can be defined by the user. For example, when the response code of the execution result indicate the request is successful (e.g., "response code 200"), the corresponding execution time of the request is compared with the predefined execution time threshold. When the predefined execution time threshold is defined as 150 ms, the execution time which is equal to or more than 150 ms is considered as unsuccessful execution.

Based on the problematic network paths, problematic network components are identified. For example, when the monitoring application unit 120 detects network issues with the HTTP request executed via the network path 130A, the network path 130B and the network path 130C, the network components (e.g., the network component A (e.g., proxy), the network component B (e.g., firewall) and the network component C (e.g., load balancer)) associated with the network paths (e.g., 130A, 130B and 130C) are identified. Further, the common network component (e.g., network component B, "firewall") between the three network paths (e.g., 130A. 130B, and 130C) is identified as a problematic network component. When the network paths (e.g., 130A, 130B and 130C, and 130D) are identified as the problematic network paths, the sample application 110 may be identified as a problematic entity. Therefore, the network issues and the source of the problem (e.g., identifying the problematic network components) can be effectively tracked.

Figure 2:
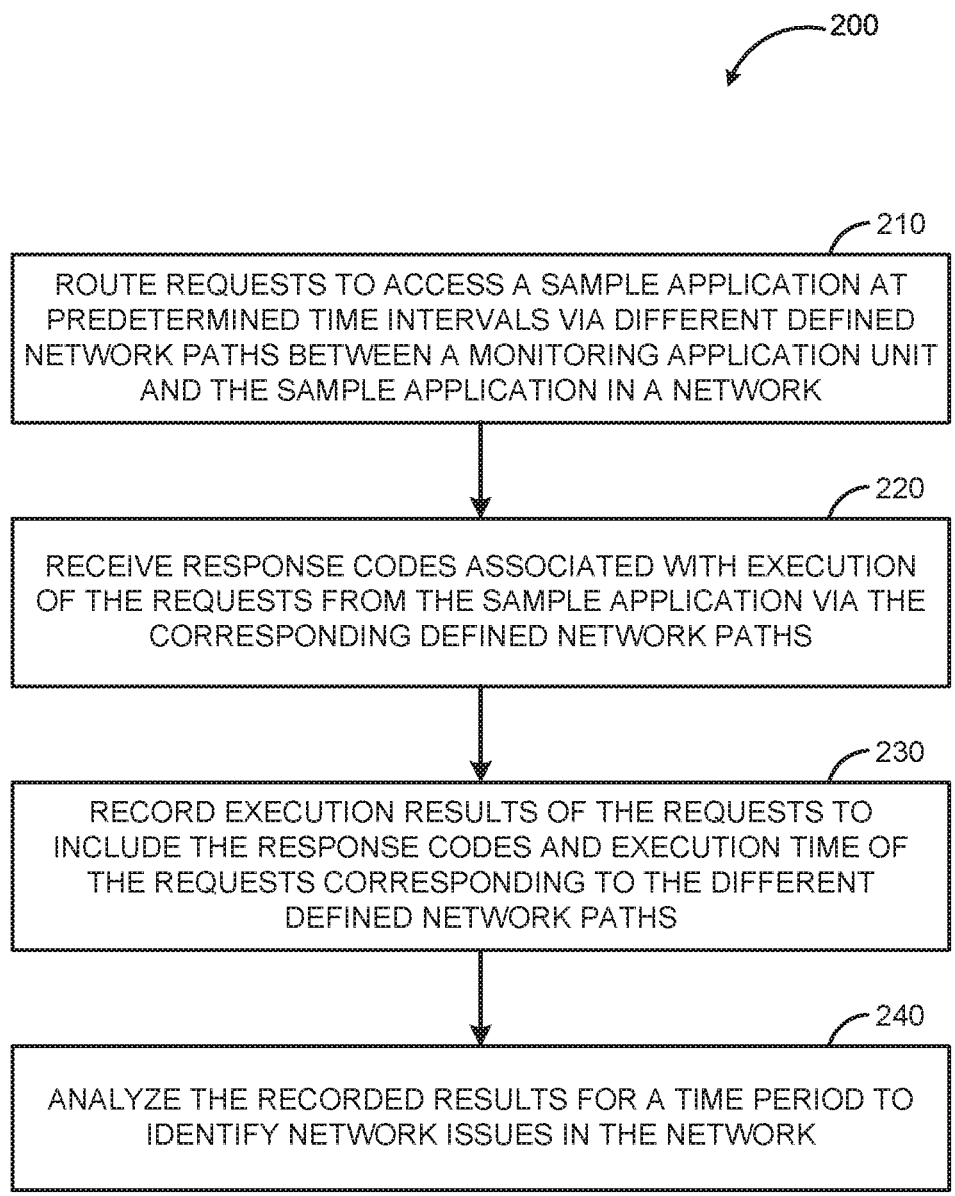
FIG. 2 is a flow diagram illustrating an example process to monitor a network to identify network issues, according to an embodiment.

FIG. 2 is a flow diagram illustrating example process 200 to monitor a network to identify network issues, according to an embodiment. At 210, requests are routed to access a sample application at predetermined time intervals via different defined network paths between a monitoring application unit and a sample application in the network. The different network paths can be defined and may include one or a set of different network components or no network component. A network component can be, but is not limited to, a "proxy", a "firewall", a "load balancer" and a "switch." For example, the predetermined time interval (e.g., every one second) can be configured by a user. Thereby, for every predetermined time interval (e.g., one second), the requests are routed to access the sample application via different defined network paths. The requests are executed at the sample application, e.g., in order of arrival.

At 220, response codes associated with execution of the requests are received from the sample application via the corresponding defined network paths. In one embodiment, upon executing the requests at the sample application, the corresponding response codes are sent via corresponding network paths to the monitoring application unit. For example, for successful execution of an HTTP request received via a network path, a response code "response code 200" is returned with an empty response body via the same network path. In one embodiment, the monitoring application unit can read and/or check the responses (e.g., response codes) received from the sample application for the corresponding requests. Further, the monitoring application unit may keep track of the corresponding network paths the requests are routed (e.g., the monitoring application unit knows, when routing the requests, via which network path it will be executed as the network paths are defined before routing the requests).

At 230, execution results of the requests to include the response codes and execution time of the requests corresponding to the different defined network paths are recorded. The execution results may include, but not limited to, the response codes, the execution time of the requests, time at which the requests are executed, and the corresponding network paths associated with the execution the requests. For example, consider there are three defined network paths (A to C) and the same requests are routed via the three defined network paths for every one second (e.g., predetermined time interval). Further, the execution results may include corresponding response codes and time taken to execute the requests via the different defined network paths (A to C).

At 240, the recorded execution results are analyzed for a time period to identify network issues in the network. Identifying the network issues may include identifying one or more problematic network paths based on the analysis of the execution results, and identifying one or more problematic network components in the one or more problematic network paths by analyzing the one or more problematic network paths. For example, the time period (e.g., 10.00 am to 12.00 pm of a particular day) during which the network to be analyzed is defined by the user. Further, the execution results recorded during the time period are retrieved and the retrieved execution results are analyzed based on the corresponding response code, the time taken to execute the requests and a predefined execution time threshold to identify the network issues (e.g., problematic network paths and in turn problematic network components).

Figure 3:
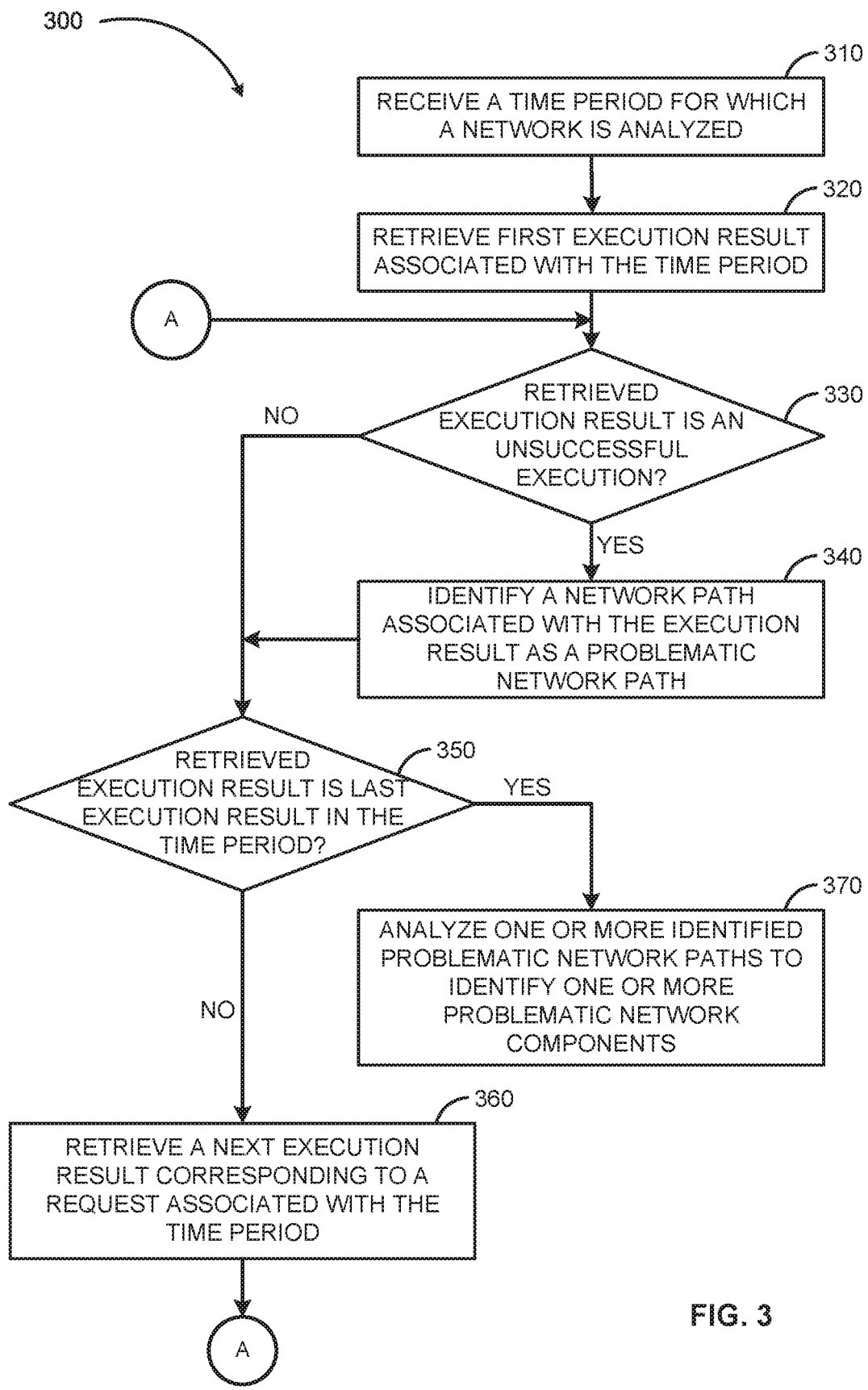
FIG. 3 is a flow diagram illustrating an example process to identify problematic network components in a network, according to an embodiment.

FIG. 3 is a flow diagram illustrating example process 300 to identify problematic network components in a network, according to an embodiment. At 310, a time period during which the network to be analyzed is received. For example, the user defines or specifies the time period. In one embodiment, the recorded execution results associated the time period are considered for analysis. At 320, a first execution result associated with the time period is retrieved.

At 330, a check is made to determine whether the retrieved execution result is a successful execution or an unsuccessful execution. In one embodiment, the request corresponding to the retrieved execution result is determined as unsuccessful based on corresponding response code, corresponding execution time, and a predefined execution time threshold. The predefined execution time threshold can be defined by the user. Determining whether the execution of the requests corresponding to the execution results are unsuccessful may include determining whether the execution of the requests are successful based on the corresponding response codes. When the execution of the requests are successful based on the corresponding response codes, the corresponding execution time are compared with the predefined execution time threshold to determine whether the execution of the requests are unsuccessful.

For example, when the corresponding response code (e.g., "response code 200") indicates that the request is successfully executed, the corresponding execution time of the request is considered. Consider the predefined execution time threshold is defined as 150 ms. Therefore, when the corresponding execution time is equal to or more than 150 ms, the request is considered as unsuccessful execution. Also, when the response code associated with the request is other than "response code 200", the request is considered as unsuccessful. Thus, when the execution result is unsuccessful (e.g., based on response codes), or when the execution time associated with the execution result is equal to or more than the predefined execution time threshold, the request corresponding to the execution result is considered as unsuccessful execution.

At 340, when the first execution result corresponding to the request is considered as unsuccessful execution, a network path associated with the execution result is identified as a problematic network path. Therefore, when the execution of the requests corresponding to the execution results are unsuccessful, corresponding network paths associated with the execution results are identified as problematic network paths. At 350, upon determining whether the network path is the problematic network path or when the retrieved execution result is considered as successful execution, a check is made to determine whether the retrieved execution result is a last execution result associated with the predetermined time period. In other words, the check is made to determine whether there are any other execution results associated with the predetermined time period are to be checked.

At 360, when there are execution results which are yet to be checked for unsuccessful execution or successful execution, such execution results are retrieved and checked. At 370, one or more identified problematic network paths are analyzed to identify corresponding problematic network components in the network. For example, the problematic network components are identified by identifying the network components associated with the problematic network paths. Further, a common network component between the problematic network paths can be identified as the problematic network component.

Figure 4:
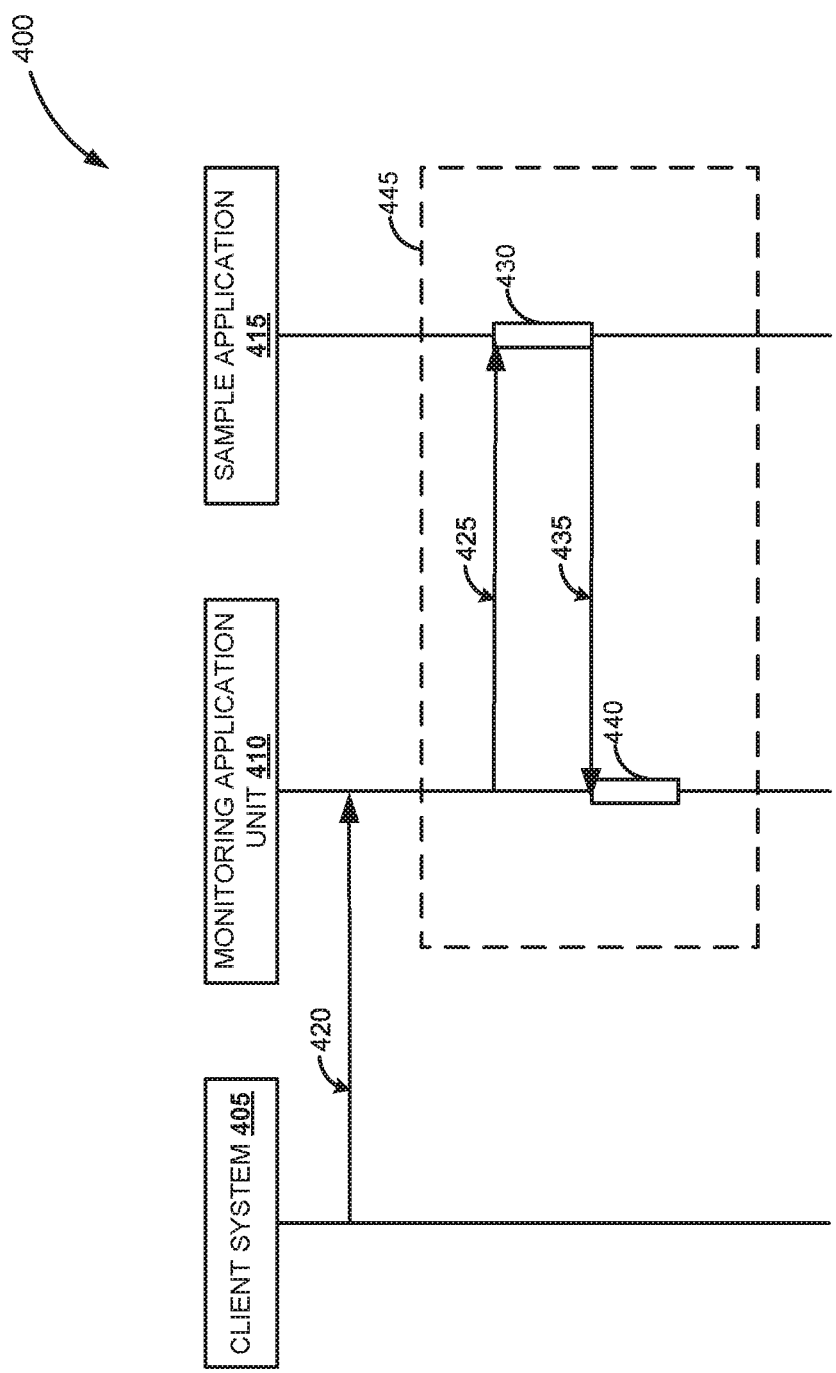
FIG. 4 is a sequence diagram illustrating an example data flow between a client system, a monitoring application unit and a sample application, according to an embodiment.

FIG. 4 is a sequence diagram illustrating example data flow 400 between client system 405, monitoring application unit 410 and sample application 415, according to an embodiment. The sequence diagram represents the interactions and the operations involved between the client system 405, the monitoring application unit 410 and the sample application 415. The vertical lines of the client system 405, the monitoring application unit 410 and the sample application 415 represent the processes that may exist simultaneously. The horizontal arrows (e.g., 420, 425 and 435) represent the process steps between the vertical lines representing their respective process objects (e.g., the client system 405, the monitoring application unit 410 and the sample application 415). Activation boxes (e.g., 430 and 440) between the horizontal arrows represent the processes performed in the respective process object.

At 420, an instruction is received from the client system 405 to monitor a network. At 425, requests are routed to access a sample application 420 at predetermined time intervals via different defined network paths in a network. The different defined network paths may include one or a set of different network components or no network component. For example, the predetermined time interval can be configured by a user (e.g., one second). Thereby, for every one second (e.g., predetermined time interval), the requests are routed to access the sample application via the different defined network paths.

At 430, the requests received via the different defined network path are executed at the sample application 415. Response code associated with the execution of the requests are forwarded to the monitoring application unit 410, at 435. For example, the sample application 415 may return a simple response (e.g. an empty response body with response code "response code 200"). Further, execution results are recorded by the monitoring application unit 410. The monitoring application unit 410 may record the corresponding response codes, time between start of the execution of the request and the end of the request (e.g., execution time of the requests via the different defined network paths). Further, the monitoring application unit 410 may store the execution results including, but not limited to the response codes, measured execution time, and the corresponding network paths associated with the execution of the request for analysis, at 440. In one embodiment, the requests are continuously routed for execution at the predetermined time intervals via the different defined network paths, and the associated execution results are recorded for analysis until an instruction to stop monitoring the network is received from the client system 405 as shown at 445 (e.g., a loop). The stored execution results are analyzed for a time period to identify network issues in the network. Identifying the network issues may include identifying one or more problematic network components in one or more problematic network paths based on the execution results.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs. DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 5:
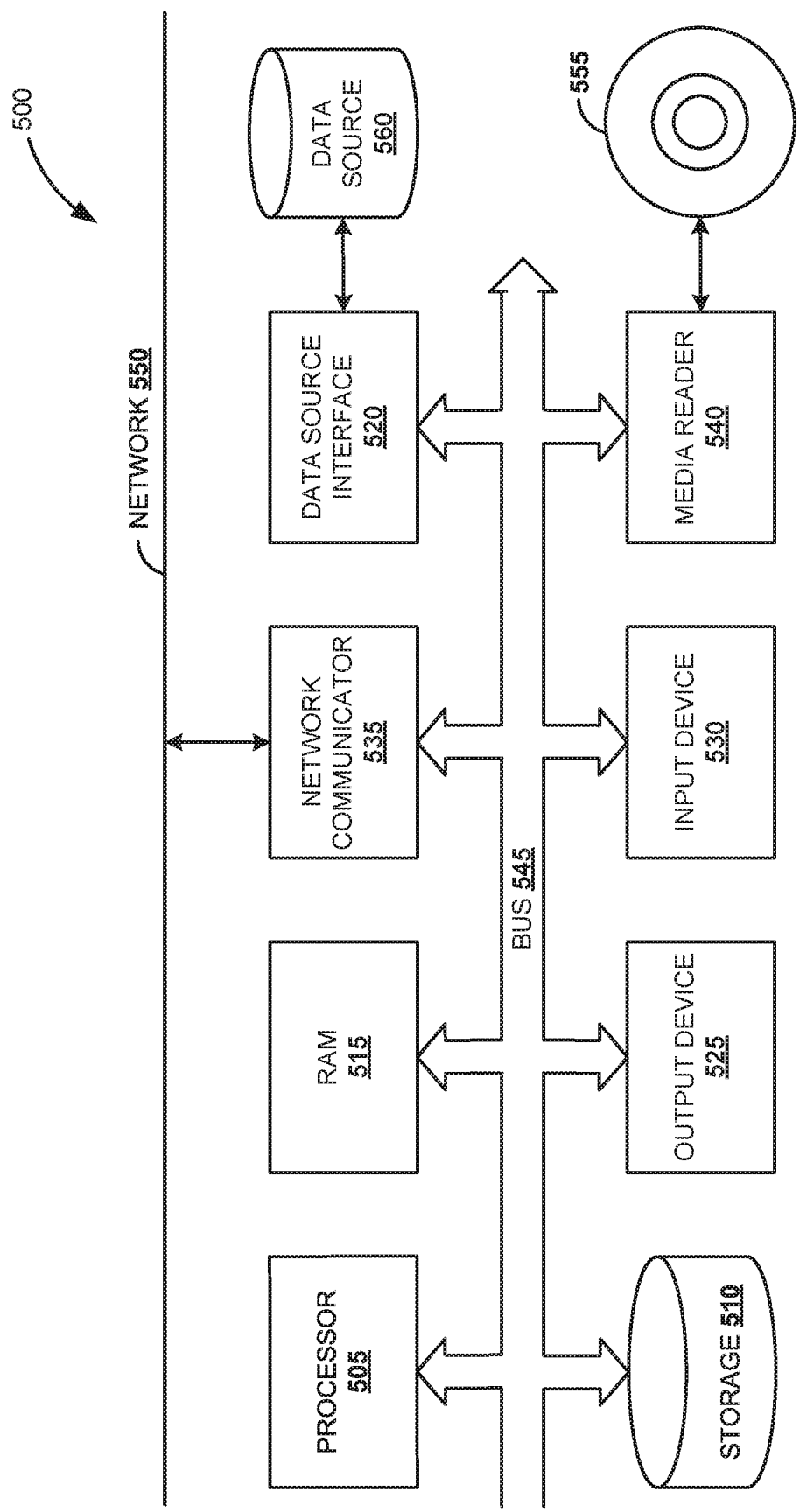
FIG. 5 is a block diagram illustrating an example computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
   route requests to access a sample application at predetermined time intervals via different defined network paths between a monitoring application unit and the sample application in a network, wherein each of the different defined network paths comprises a common network start point and a common network end point and a different respective set of intermediate network components through which a request is routed between the monitoring application unit and the sample application, and the different defined network paths include different combinations of the set of intermediate nodes such that one defined network path includes the set of intermediate nodes and other defined network paths include different subsets of the set of intermediate nodes;

receive response codes associated with execution of the requests from the sample application via the corresponding defined network paths;

record execution results of the requests including the response codes and execution time of the requests corresponding to the different defined network paths;

identify problematic network paths of the different defined network paths based on the execution results; and identify a common network component between the problematic network paths as a problematic network component.

2. The non-transitory computer-readable medium of claim 1, further comprising analyzing the execution results for a time period based on the response codes, the execution time of the requests, and a predefined execution time threshold.

3. The non-transitory computer-readable medium of claim 2, wherein analyzing the execution results for the time period comprises:

retrieving the execution results associated with the time period;

determining whether execution of the requests corresponding to the execution results are unsuccessful based on the corresponding response codes, corresponding execution time, and the predefined execution time threshold; and identifying corresponding network paths associated with the execution results as problematic network paths when the execution of the requests corresponding to the execution results are unsuccessful.

4. The non-transitory computer-readable medium of claim 3, wherein determining whether the execution of the requests corresponding to the execution results are unsuccessful comprises:

determining whether the execution of the requests are successful based on the corresponding response codes; and when the execution of the requests are successful, comparing the corresponding execution time with the predefined execution time threshold to determine whether the execution of the requests are unsuccessful.

5. A computer-implemented method for monitoring a network, the method comprising:

routing requests to access a sample application at predetermined time intervals via different defined network paths between a monitoring application unit and the sample application in a network, wherein each of the different defined network paths comprises a common network start point and a common network end point and a different respective set of intermediate network components through which a request is routed between the monitoring application unit and the sample application, and the different defined network paths include different combinations of the set of intermediate nodes such that one defined network path includes the set of intermediate nodes and other defined network paths include different subsets of the set of intermediate nodes;

receiving response codes associated with execution of the requests from the sample application via the corresponding defined network paths;

recording execution results of the requests including the response codes and execution time of the requests corresponding to the different defined network paths;

identifying problematic network paths of the different defined network paths based on the execution results; and identifying a common network component between the problematic network paths as a problematic network component.

6. The computer-implemented method of claim 5, further comprising analyzing the execution results for a time period based on the response codes, the execution time of the requests, and a predefined execution time threshold.

7. The computer-implemented method of claim 6, wherein analyzing the execution results for the time period comprises:

retrieving the execution results associated with the time period;

determining whether execution of the requests corresponding to the execution results are unsuccessful based on the corresponding response codes, corresponding execution time, and the predefined execution time threshold; and identifying corresponding network paths associated with the execution results as problematic network paths when the execution of the requests corresponding to the execution results are unsuccessful.

8. The computer-implemented method of claim 7, wherein determining whether the execution of the requests corresponding to the execution results are unsuccessful comprises:

determining whether the execution of the requests are successful based on the corresponding response codes; and when the execution of the requests are successful, comparing the corresponding execution time with the predefined execution time threshold to determine whether the execution of the requests are unsuccessful.

9. A computing system comprising:

at least one processor; and one or more memory devices communicative with the at least one processor, wherein the one or more memory devices store instructions to:

route requests to access a sample application at predetermined time intervals via different defined network paths between a monitoring application unit and the sample application in a network, wherein each of the different defined network paths comprises a common network start point and a common network end point and a different respective set of intermediate network components through which a request is routed between the monitoring application unit and the sample application, and the different defined network paths include different combinations of the set of intermediate nodes such that one defined network path includes the set of intermediate nodes and other defined network paths include different subsets of the set of intermediate nodes;

receive response codes associated with execution of the requests from the sample application via the corresponding defined network paths;

record execution results of the requests including the response codes and execution time of the requests corresponding to the different defined network paths;
identifying problematic network paths of the different defined network paths based on the execution results; and
identifying a common network component between the problematic network paths as a problematic network component.

10. The computing system of claim 9, further comprising analyzing the execution results for a time period based on the response codes, the execution time of the requests, and a predefined execution time threshold.

11. The computing system of claim 10, wherein analyzing the execution results for the time period comprises:
retrieving the execution results associated with the time period;
determining whether execution of the requests corresponding to the execution results are unsuccessful based on the corresponding response codes, corresponding execution time, and the predefined execution time threshold; and
identifying corresponding network paths associated with the execution results as problematic network paths when the execution of the requests corresponding to the execution results are unsuccessful.

12. The non-transitory computer-readable medium of claim 1, wherein a first defined network path comprises an overlapping intermediate network component with a second defined network path and a non-overlapping intermediate network component with the second defined network path.

13. The non-transitory computer-readable medium of claim 1, wherein the common network start point is a computing device that hosts the monitoring application, and the common network end point is a computing device that hosts the sample application.

14. The non-transitory computer-readable medium of claim 1, wherein one of the defined network paths does not include any intermediate network components between the monitoring application unit and the sample application.

15. The non-transitory computer-readable medium of claim 1, wherein different intermediate nodes are removed from the set of intermediate nodes to configure the different subsets of the set of intermediate nodes on the other defined network paths, respectively.

* * * * *